United States Patent [19]
Klomp et al.

[11] 4,432,312
[45] Feb. 21, 1984

[54] ENGINE INTAKE PORT WITH VARIABLE SWIRL VANES

[75] Inventors: Edward D. Klomp; David A. Stevens, both of Mt. Clemens, Mich.

[73] Assignee: General Motors Corporation, Detroit, Mich.

[21] Appl. No.: 346,565

[22] Filed: Feb. 8, 1982

[51] Int. Cl.³ .............................................. F01L 3/00
[52] U.S. Cl. .............................. 123/188 VA; 123/306
[58] Field of Search ............ 123/188 M, 188 VA, 306

[56] References Cited

U.S. PATENT DOCUMENTS 2,920,613  1/1960  Vogel .............................. 123/188 M
3,035,558  5/1962  Wiebicke ........................ 123/188 M

FOREIGN PATENT DOCUMENTS 300618    9/1932  Italy ................................... 123/306
52-31212  3/1977  Japan ............................. 123/188 M
54-55216  5/1979  Japan ................................ 123/306

Primary Examiner—Ronald B. Cox
Attorney, Agent, or Firm—Robert J. Outland

[57] ABSTRACT

Adjustable swirl developing vane means are provided in the outlet end portions of the intake ports of an internal combustion engine adjacent the intake valve heads to provide variable swirl of cylinder intake charges through adjustment of the vane positions. Both rigid and flexible adjustable vane arrangements are disclosed as are various means for positioning the vanes.

2 Claims, 12 Drawing Figures

DEVELOPED VIEW

ENGINE INTAKE PORT WITH VARIABLE SWIRL VANES

TECHNICAL FIELD

This invention relates to internal combustion engines having variable cylinder charge swirl developing means and more particularly to intake ports provided with variable swirl developing vanes.

BACKGROUND

The use of cylinder charge swirl in internal combustion engines to promote fast and efficient combustion, especially at part load, is well known. Numerous methods for obtaining inlet charge swirl have been devised, including variously shaped intake ports and stationary flow guides or vanes. Such fixed geometry arrangements, in general, provide less than ideal results, in that the amount of swirl obtained in part load or part throttle conditions is less than desired or the swirl devices impose an undesirable restriction to inlet flow under full load or full throttle conditions.

Some attempts have been made to provide variable port geometry to obtain the desired combination of high part throttle swirl with low restriction at full throttle or maximum load. Such arrangements generally have involved devices located at the intake port entrance or in the runner substantially upstream from the end portion of the port adjacent to the cylinder and distal from the head of the associated intake valve.

SUMMARY OF THE INVENTION

The present invention proposes the application of a plurality of moveable vanes in the end portion of the intake port adjacent to the intake valve head to efficiently provide for varying the degree of swirl applied to the cylinder intake charge under the varying conditions of engine throttle or load. In this manner, the desired conditions of high swirl at part throttle with relatively free flow at full load or throttle are efficiently met. Various specific adjustable swirl vane arrangements employing rigid or flexible swirl developing turning vanes are provided.

These and other features and advantages of the invention will be more fully understood from the following description of certain preferred embodiments taken together with the accompanying drawings.

BRIEF DRAWING DESCRIPTION

DETAILED DESCRIPTION

Figure 1:
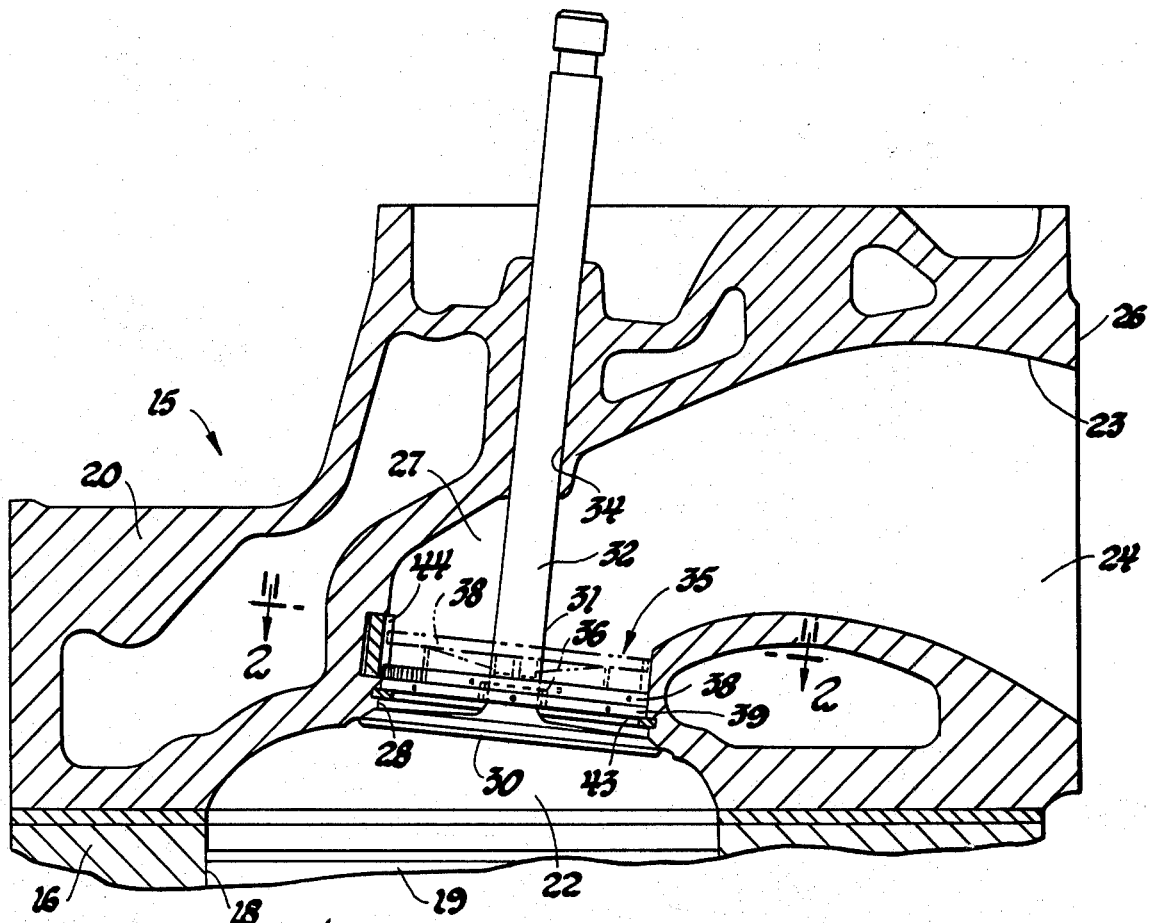
FIG. 1 is a fragmentary cross-sectional view of an internal combustion engine having adjustable rigid swirl vanes in each intake port in accordance with the invention.
Figure 2:
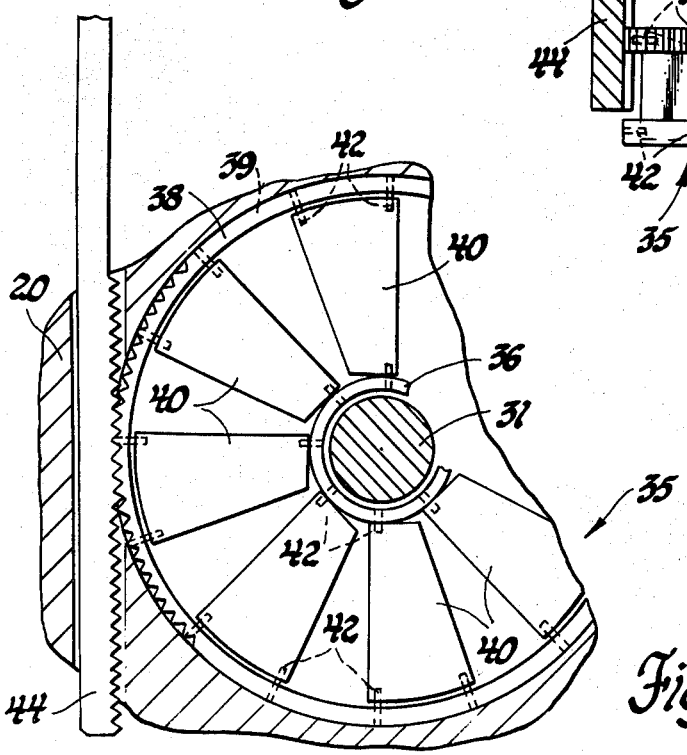
FIG. 2 is an enlarged cross-sectional view showing the vanes from the plane indicated by the line 2—2 of FIG. 1.
Figure 3:
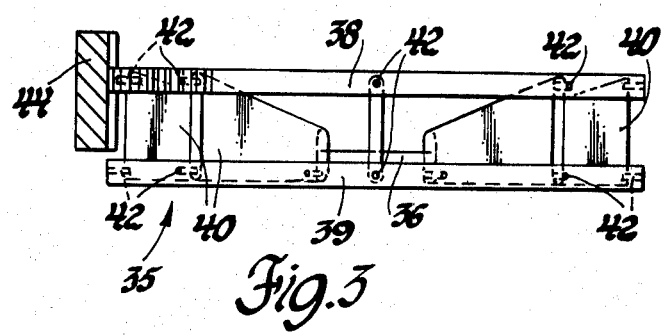
FIG. 3 is an enlarged side view of the vane assembly of the embodiment of FIGS. 1 and 2 illustrated in the minimum swirl position.

Referring first to FIGS. 1-4 of the drawings, numeral 15 generally indicates an internal combustion engine formed in accordance with the invention. Engine 15 includes a cylinder block 16 defining a plurality of cylinders 18 each having a piston 19 reciprocable therein. A cylinder head 20 closes the end of the cylinders and defines, with the pistons, variable volume combustion chambers 22 at the cylinder closed ends.

Each combustion chamber may conventionally be provided with an exhaust port and exhaust valve as well as with additional devices such as, for example, a spark plug in the case of a spark ignition engine or a fuel injection nozzle in the case of a diesel engine, none of these devices being illustrated.

In order to supply each of the combustion chambers with inlet charges of air or air-fuel mixture, an intake port 23 is provided in the cylinder head for each cylinder of the engine. Each port 23 extends from an inlet portion 24, opening through a side wall 26 of the cylinder head and extending laterally into the head to connect with an outlet end portion 27 adjacent to the closed end of the cylinder. The end portion 27 communicates with the combustion chamber 22 through an opening 28 that may be closed by the head 30 of an intake poppet valve 31. The valve has a stem 32 that extends upwardly from the head centrally of the port end portion and is reciprocably supported in a valve guide 34 forming a portion of the cylinder head.

Within each port end portion 27, as closely adjacent to the valve head as possible, each intake port is provided with adjustable swirl developing means in the form of an adjustable turning vane assembly generally indicated by numeral 35. Assembly 35 includes an inner ring 36 and upper and lower outer rings 38, 39 respectively all extending around and coaxial with the intake valve stem 32. A plurality of annularly spaced radially extending vanes 40 of rigid construction are adjustably secured at bearing pivots 42 to the three rings 36, 38, 39.

The lower outer ring 39 is supported by a snap ring 43 in a fixed position within and bearing against the cylindrical outer wall of the intake port end portion 27 adjacent to the intake valve head 30. The inner ring 36 is supported in radial alignment with the outer ring by the radial vanes 40 and their bearing pivots 42. The upper outer ring 38 lies above the lower ring 39 in close, freely moveable relation with the port wall to allow rotational movement of the ring 38. A toothed rack 44 engages mating teeth formed on the outer surface of the upper ring 38 to provide for rotational adjustment of the ring in a limited arc of movement.

Figure 4:
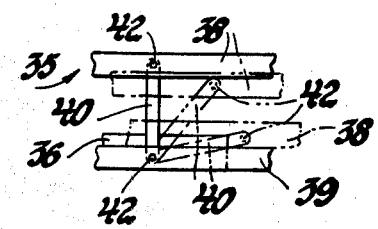
FIG. 4 is a fragmentary side view illustrating the vane motion.
Figure 5:
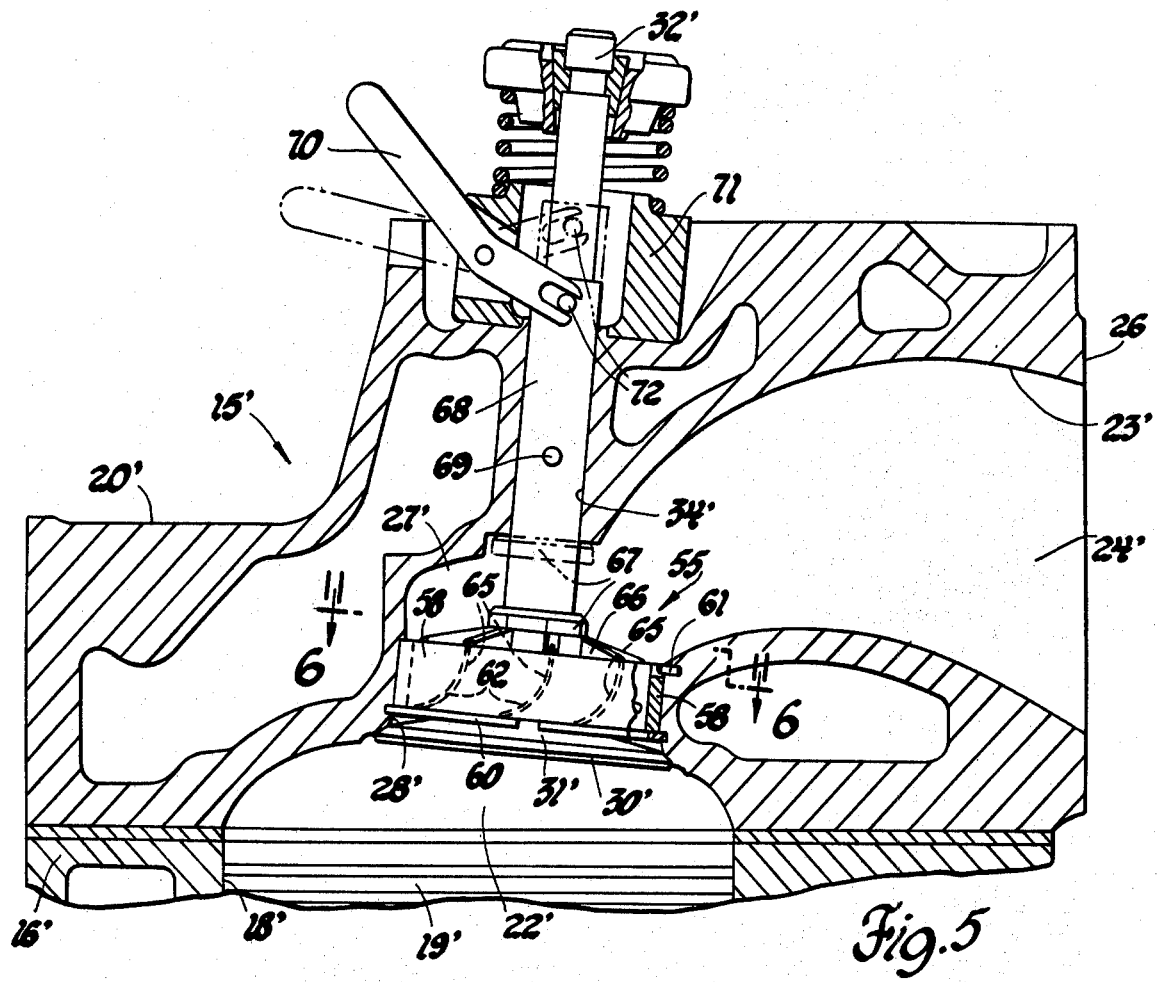
FIG. 5 is a fragmentary cross-sectional view similar to FIG. 1 but showing the application of one form of flexible turning vanes in the intake port.
Figure 6:
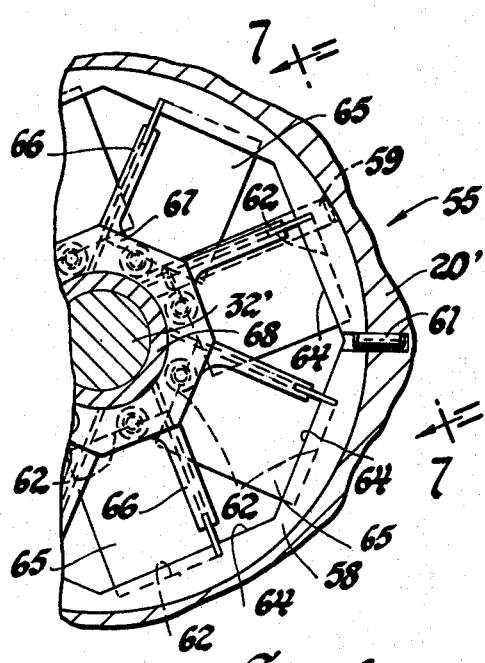
FIG. 6 is an enlarged cross-sectional view of the vanes from the plane indicated by the line 6—6 of FIG. 5.
Figure 7:
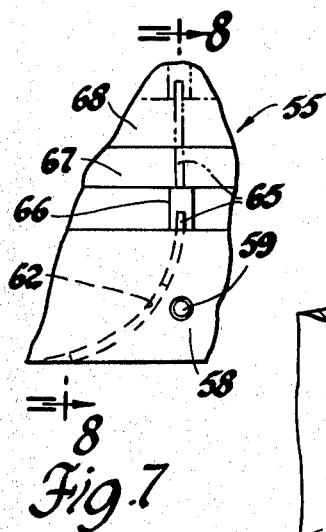
FIG. 7 is an enlarged side view of the vane assembly from the plane indicated by the line 7—7 of FIG. 6 illustrating the action of one of the vanes.
Figure 8:
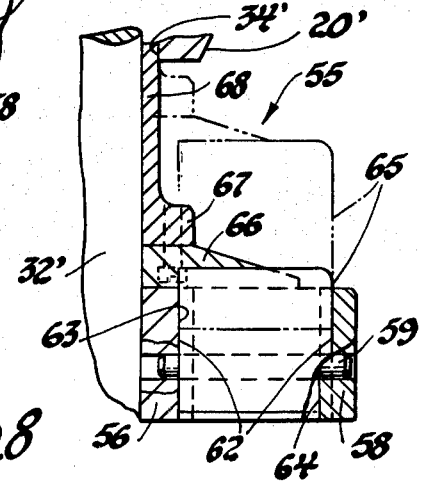
FIG. 8 is an enlarged cross-sectional view through the vane assembly from the plane indicated by the line 8—8 of FIG. 7.

In operation, linear movement of the rack by any suitable means, not shown, rotates the upper ring 38, causing the rigid turning vanes 40, pivotably connected therewith, to oscillate between vertical positions shown in the solid lines of views 3 and 4 and positions increasingly approaching horizontal as shown in the dashed lines of FIG. 4. As the upper ring is rotated counterclockwise as viewed from the top, it also moves with the connected vane as it pivots downwardly from its upper position, shown in FIG. 3, to its lower position lying on the lower ring as shown in the solid lines of FIG. 1 and the dashed lines of FIG. 4. This adjustment of the ring 38 moves the vanes from a vertical position in which they essentially develop little or no swirl in charges entering the cylinder through the intake port when the intake valve is open to increasingly swirl forming positions, reaching a maximum swirl forming position when the upper ring 38 is fully rotated and moves downwardly to its lowest position.

Referring now to FIGS. 5-8 of the drawings, there is shown an alternative embodiment of engine formed in accordance with the invention in which another form of swirl forming turning vane assembly, using flexible vanes, is provided in each engine intake port. Since the features of the engine, other than the vane assembly are generally similar to the embodiment previously described, primed numerals have been used for like parts.

In the embodiment of FIGS. 5-8, the intake port 23' is provided, in its outlet end portion 27' adjacent to the valve head 30' with an adjustable vane assembly generally indicated by numeral 55. Assembly 55 includes inner and outer guide rings 56, 58 respectively which are secured together by a pin 59 to form a stationary ring assembly. The ring assembly is supported on a snap ring 60 and is fixed in position by a pin 61 that prevents its rotation within the cylindrical outer wall of the port end portion 27' in which it is located adjacent the valve head. Curved guide slots 62, are formed in concentric octagonally configured radially opposing faces 63, 64 of the inner and outer rings respectively.

Within the slots 62 are received the lower ends of a plurality of longitudinally and outwardly extending flexible vanes 65. The vanes are eight in number in the embodiment disclosed, although any suitable number of vanes could be utilized. The vanes 65 are supported along their tops by a support arm member 66 which is in turn secured to a central hub 67 formed on the bottom of a tubular member 68. Member 68 is reciprocably received around the valve stem 32' within the valve guide 34' to position the moveable vane subassembly 65-68. A pin 69 extending from the tubular member 68 into a groove, not shown, of the valve guide prevents rotation of the vane subassembly on its axis.

The vane subassembly 65-68 is vertically moveable on its axis by pivoting a lever 70 that is pivotably supported on a head mounted insert 71 and engages a pin 72 extending from the tubular member 68.

In operation, movement of the lever 70, which may be accomplished through suitable external linkage or control means, not shown, causes movement of the vane subassembly from its lower position shown in solid lines in FIGS. 5-8 and its upper position, shown in dashed lines. Such movement raises or lowers the flexible vanes 65 within the curved guide slots 62 to move them between an upper minimum swirl position wherein they are nearly parallel with the valve axis and a lower maximum swirl position wherein they are flexed by the curved slots 62 into curved configurations with the lower ends nearly horizontal, thus creating a maximum swirl in intake charges admitted to the cylinder through the intake port.

Referring now to FIGS. 9-12 of the drawings, there is shown still another embodiment of engine having a differing form of flexible swirl creating vane means in accordance with the invention. Since portions of the engine other than the vane assembly are generally similar to the first described embodiment, double primed numbers have been used for like parts.

Figure 9:
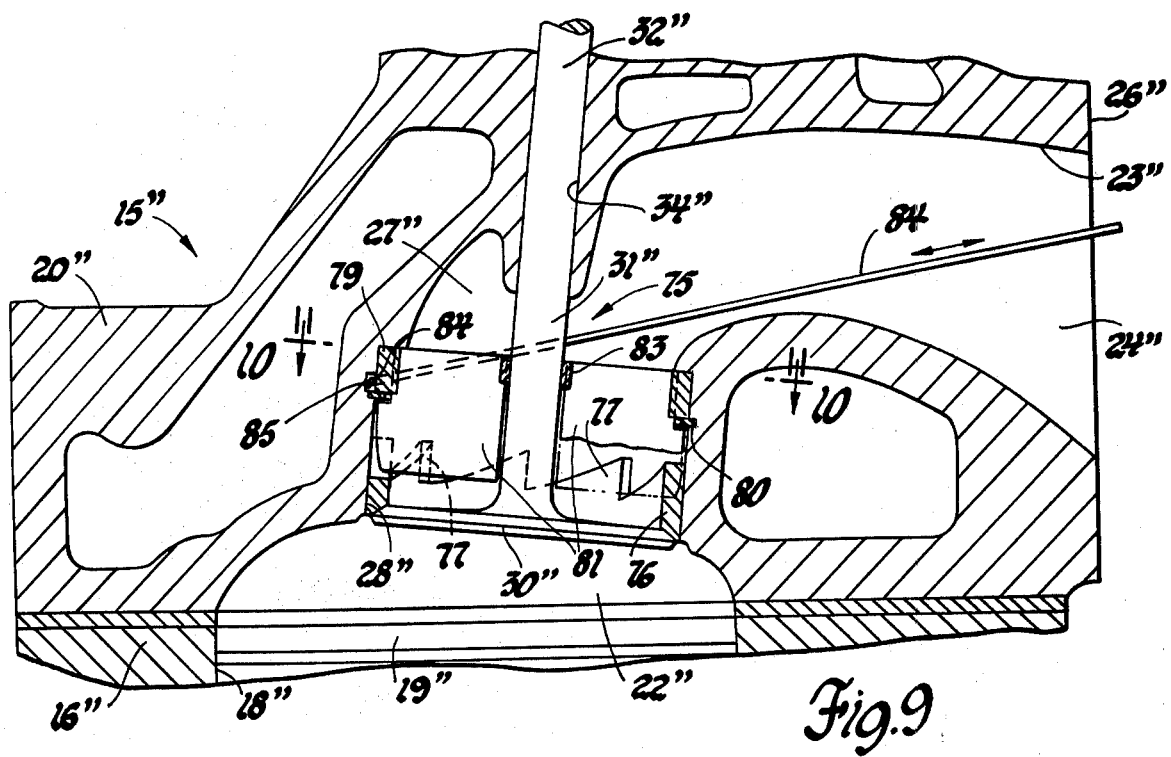
FIG. 9 is a fragmentary cross-sectional view similar to FIGS. 1 and 5 and illustrating the application of another embodiment of flexible turning vanes.
Figure 10:
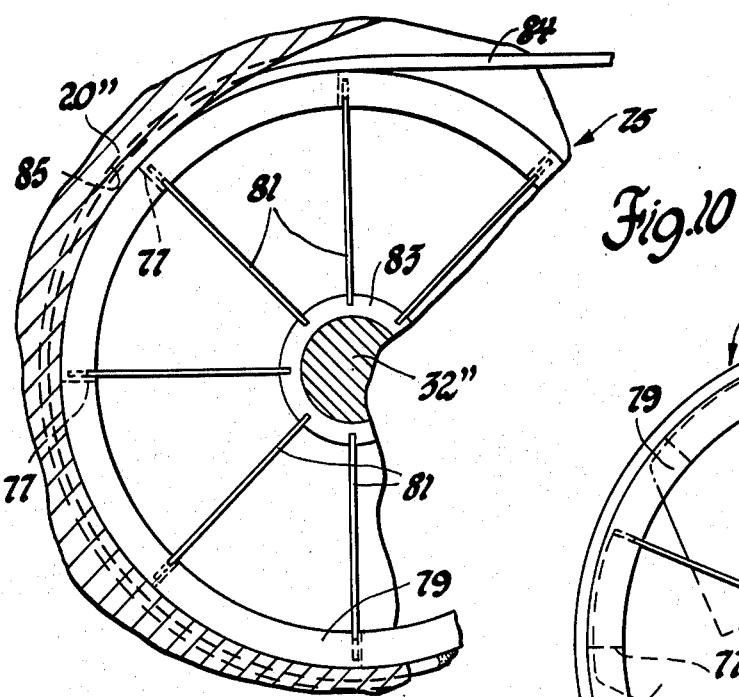
FIG. 10 is an enlarged cross-sectional view of the vanes from the plane indicated by the line 10—10 of FIG. 9.
Figure 11:
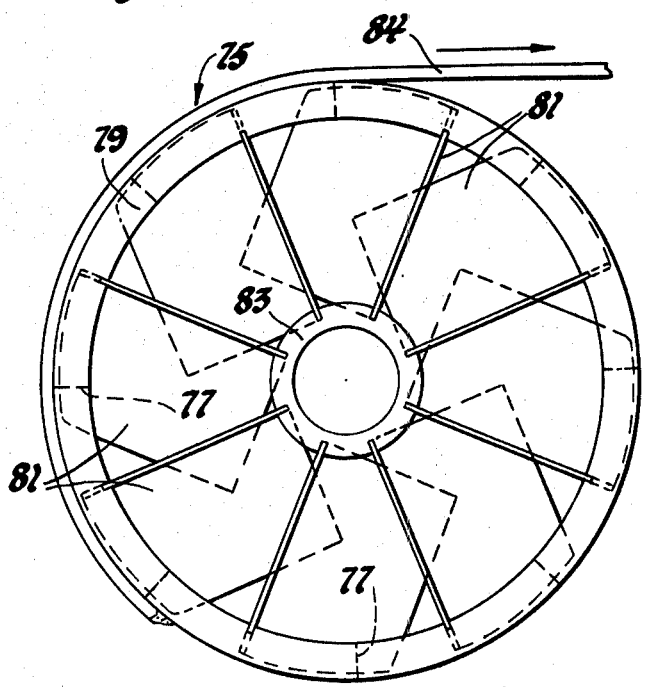
FIG. 11 is a view of the vane construction showing the vanes positioned in the maximum swirl position.
Figure 12:
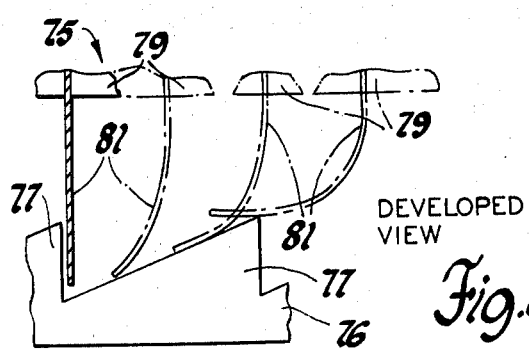
FIG. 12 is a developed view illustrating the vane configuration in various swirl positions.

In the embodiment of FIGS. 9-11, the intake port 23" is provided at its outlet end 27" with an adjustable flexible vane assembly arrangement generally indicated by numeral 75. Assembly 75 includes a fixed lower ring 76 carried in the port outer wall adjacent the valve head and having on its upper edge a plurality of vane-engaging teeth 77. Spaced above the lower ring 76 is a moveable upper ring 79, rotatably supported on a snap ring 80 for oscillating movement within the surrounding port wall.

Ring 79 supports a plurality of downwardly and radially inwardly extending flexible vanes 81 which are interconnected by an inner ring 83 loosely fitted about the valve stem 32". From the concentrically spaced rings 79, 83, the vanes 81 extend downwardly in the annular space around the valve stem and into spaces between the teeth 77 on the lower ring 76 fixed along the port wall. If desired, the teeth 77 could be formed as an integral part of the port wall rather than being made on a separate ring element.

The upper rings 79, 83 and their connecting radial vanes 81, are capable of limited rotation or oscillation about the valve axis through the use of suitable actuating means. In the present instance, the actuating means comprise a flexible wire 84 wrapped around the outer surface of the upper ring 79 within a clearance groove 85 and extending out through the port opening for actuation by suitable control means not shown.

In operation, limited linear adjustment of the outwardly extending end of the flexible wire 84 controls the angular position of the oscillatable upper ring 79 and thereby positions the associated vanes 81. In the minimum swirl position, the flexible vanes 81 extend vertically into the spaces between adjacent teeth 77 of the lower ring, so that intake charges to the cylinder enter without substantial swirl. Linear adjustment of the wire 84 to cause clockwise rotation of the vane assembly, as viewed from above, causes engagement of the outer edges of the vanes with the tapered ramp portions of their associated teeth 77. Such engagement increasingly deflects the vanes as illustrated in the developed view of FIG. 12 to reposition the vanes from the vertical minimum swirl position shown in FIG. 10 to the fully flexed position shown in FIG. 11, wherein maximum swirl of the intake charge is created.

The various vane constructions of the illustrated embodiments each have advantages which might warrant the use of one or another specific embodiment in a particular application. In addition, numerous additional variations from the embodiments disclosed could be utilized within the spirit and scope of the inventive concepts described. Accordingly, it is intended that the invention not be limited solely to the described embodiments, but that it have the full scope permitted by the language of the following claims.

The embodiments of the invention in which an exclusive property or privilege is claimed are defined as follows:

1. The combination in an internal combustion engine of a cylinder having a closed end, means defining an intake port opening to the cylinder through the cylinder closed end, the port having an end portion adjacent to the cylinder, a poppet valve in the port having a head engageable with the port defining means near the cylinder closed end to close communication between the port and the cylinder and a stem connected with the head and extending centrally of the port end portion, the stem being reciprocably supported by the port defining means for movement of the valve longitudinally of the stem into open and closed positions, and adjustable swirl means in said port end portion adjacent to the valve head, said swirl means comprising means supporting a plurality of flexible vanes in annularly spaced relation around said valve stem in said port end portion and extending in directions generally outwardly from the valve stem and longitudinally along the direction of flow through the port end portion, said vanes being received in curved slots of slotted guide means disposed within the port, said vane supporting means and said slotted guide means being relatively moveable to flex portions of said vanes to vary their angular relation with respect to the longitudinal axis of the valve, whereby a rotational swirl component of fluid flow within the port is increased or decreased.

2. The combination of claim 1 wherein said vane supporting means includes a tubular element surrounding said vane stem and axially moveable along the valve axis to provide said vane flexing relative motion, said slotted guide means being fixed within said port end portion.

* * * * *